June 26, 1951 F. F. MURRAY 2,558,661

TELEPHONE GUARD

Filed Dec. 30, 1949

INVENTOR.
Forrest F. Murray
BY Heard Smith & Tennant
Attorneys

Patented June 26, 1951 2,558,661

UNITED STATES PATENT OFFICE 2,558,661

TELEPHONE GUARD

Forrest F. Murray, Brockton, Mass.

Application December 30, 1949, Serial No. 136,062

4 Claims. (Cl. 179—178)

Telephone instruments of the common types, consisting of a base member and a hand set having the transmitting and receiving members, render the telephone active for use simply by removing the hand set from the base, with the hand set acting when in position on the base to maintain the instrument inactive. Such telephone instruments are frequently improperly rendered active by children removing and playing with the hand set, or by the hand set being shifted from its position on the base by the accidental engagement of some adjacent object therewith. Whenever by reason of such happenings or other causes the hand set is thus removed from or misplaced on the base the instrument is improperly rendered active and when this takes place calls to the instrument cannot be made to the great inconvenience not only of the telephone user but to the exchange with which the instrument is connected. Such inconvenience is greatly multiplied when, as is quite common, two or more instruments are located on a single line because then all the instruments on the line, even when only one hand set is improperly removed or misplaced, are usually rendered inoperative.

The object of the present invention is to provide a simple and effective device readily attachable to the instrument and effectively guarding it against being unintentionally rendered active by the improper removal or displacement of the hand set.

A further object of the invention more specifically resides in a clip readily attachable to the base of the instrument and having a plate hinged thereto to extend over the usual operating plungers in the base, with latching means for latching the plate to the clip to hold the plungers in their normally depressed position rendering the telephone inactive and requiring unlatching of this plate to permit the plungers to rise and render the telephone active. Thus if a child or other person intentionally or inadvertently removes the hand set no inconvenience is caused and a normal user of the telephone merely has to unlatch the plate when desiring to use the instrument.

These and other objects and features of the invention will appear more fully from the accompanying description and drawing and will be pointed out in the claims.

The drawings illustrate a simple and preferred form of the invention as applied to the type of telephone instrument now widely in use and in general illustrated, for example, in the patent to Kuhn et al. No. 2,096,046, October 19, 1937, but the invention is also applicable to any standard form of telephone instrument of the removable hand set type.

Figure 5:
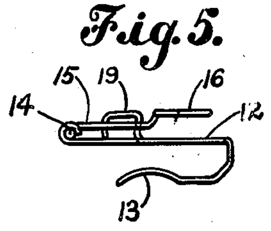

Fig. 5 a similar view but with the hinged plate in latched position.

The telephone instrument illustrated, and which of itself forms no part of the invention, comprises a base having a generally rectangular lower portion 1 with an upstanding pedestal portion 2 terminating at the top in a cradle portion 3 which is provided with two pairs of spaced tines 4—4 and 5—5. Between each pair of these tines there is mounted in the base a cylindrical plunger 6. In this type of instrument, when the hand set which comprises a handle bar 7 with a receiver 8 at one end and the transmitter 9 at the other, is at rest on the base between the tines it acts to hold the plungers depressed and the telephone instrument inactive while removal of the hand set from the base permits the plungers to rise and render the instrument active.

In the particular type of instrument illustrated the pedestal portion is formed with a large recess 10 opening rearward centrally beneath the cradle portion and this recess has an upper relatively thin flat wall portion 11 extending rearward. This construction is provided so that a person desiring to remove the entire instrument from place to place may insert the fingers in the recess and thus readily lift and carry the instrument.

In this specific construction thus illustrated this wall portion 11 provides an effective and suitable element to which the clip of this invention may be readily gripped and the clip in the preferred form illustrated is of a type to fit and be gripped to this wall portion.

The device in the preferred form illustrated comprises the clip proper shown as a flat plate 12 with a reversely curved flange having a pair of resilient tongues 13 extending spaced from and yieldingly held toward the plate 12, so that when the clip is passed over the wall portion 11 the clip is firmly gripped thereto. This clip has hinged thereto at 14 a plate formed to extend over the two plungers 6 when the clip is in position and as illustrated this plate comprises a flat portion 15 terminating in a narrow offset section 16 extended laterally at both sides and shaped so that when the plate is latched to the clip these extensions will rest upon the plungers 6 and hold them in depressed position.

The latching means by which the hinged plate may be latched to and unlatched from the clip may obviously vary in construction but in its preferred form comprises an aperture 17 formed in the plate 15 and a resilient shouldered tongue 18 struck up from the clip 12 and cooperating therewith. This tongue 18 is shown with an elevated portion 19 having its rear upstanding wall 20 inclined slightly rearwardly so as to hook over the aperture 17.

Figures 1, 2, 3, 4:
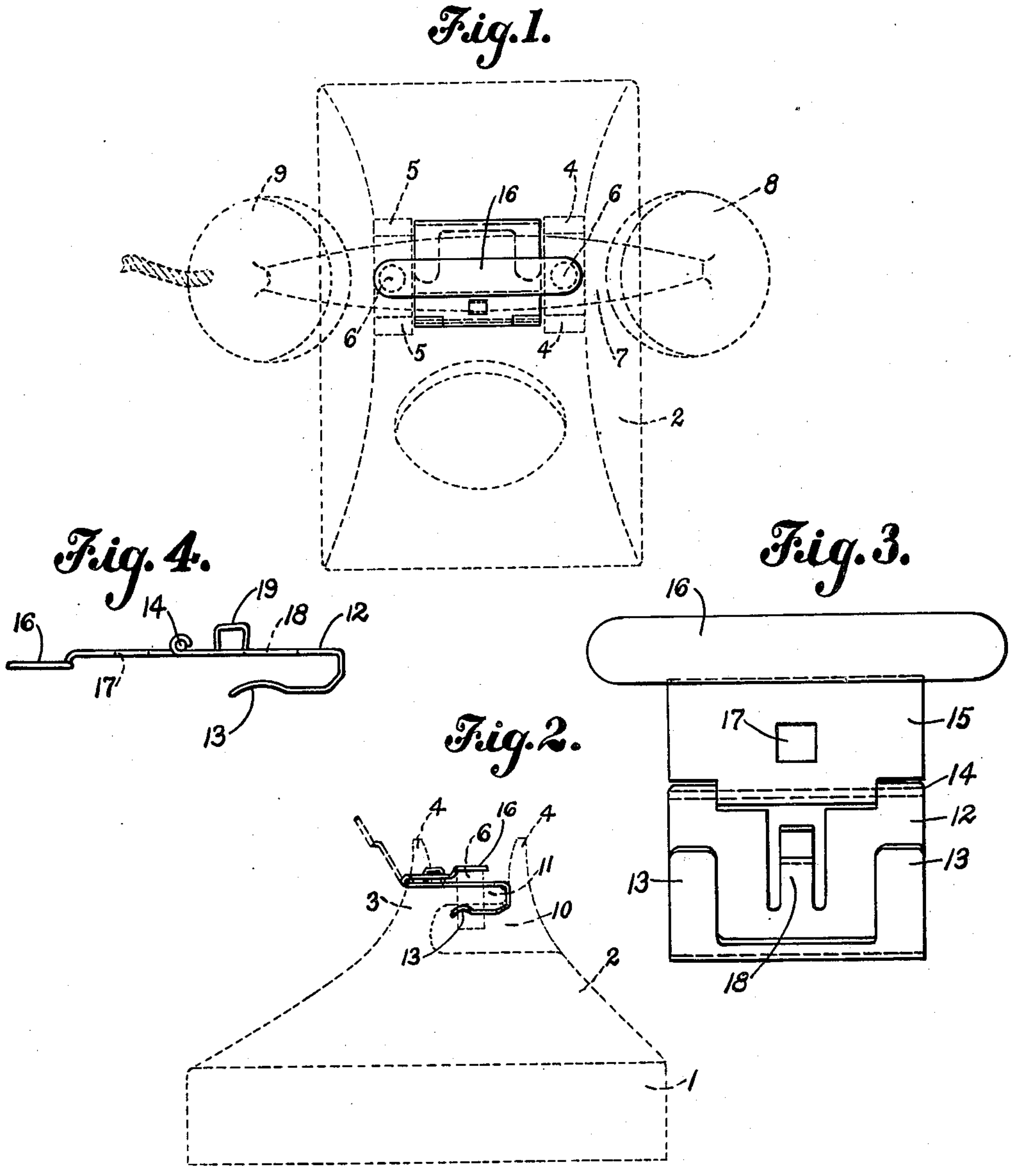
Fig. 1 is a top plan view of a preferred form of the device shown in place with the telephone instrument itself, including the hand set, indicated in dotted lines.
Fig. 2 is a side elevation of the construction illustrated in Fig. 1 with the hand set removed, with the hinged plate shown in full lines latched to the clip and holding the plungers depressed and with the plate shown in dotted lines swung away to permit the plungers to rise.
Fig. 3 is a bottom plan view of the device with the hinged plate swung to full open position.
Fig. 4 is a side elevation of the construction shown in Fig. 3.

It will thus be seen that with the device in position, as shown for example in Figs. 1 and 2, with the hinged plate locked to the clip the plungers are held depressed with the telephone instrument inactive and any removal of the hand set from the instrument will not of itself render the instrument active so that no danger is incurred by a child playing therewith by an accidental engagement of some object with the hand set, or otherwise. Whenever a person desires to use the instrument all that is necessary after removing the hand set is to unlatch the hinged plate and at once the plungers are permitted to rise and render the telephone active just as they do when the clip is not present and the hand set is removed.

Having thus described the invention, what is claimed as new, and desired to be secured by Letters Patent, is:

1. A guard for a telephone instrument of that type having a base with a pair of operating plungers mounted for movement therein and with a cradle portion of the base acting to position the hand set resting upon and holding the plungers depressed to render the telephone inactive, comprising a clip, a plate, means for hinging the plate to the clip to position it to extend over the plungers when the clip is attached to the base, and latching means for latching the plate to the clip to hold the plungers depressed, whereby when latched the hand set may be removed from the base without rendering the telephone active and unlatching of the plate is required to permit the plungers to rise and render the telephone active.

2. A guard for a telephone instrument of that type having a base with a pair of operating plungers mounted for vertical movement therein with a cradle portion acting to position the hand set resting upon and holding the plungers depressed to render the telephone inactive, and with a recess opening rearward centrally beneath the cradle portion having an upper wall portion for lifting and carrying the instrument, comprising a clip for gripping the said upper wall portion, a plate, means for hinging the plate to the clip to position it to extend over the plungers when the clip is gripped to said upper wall, and latching means for latching the plate to the clip to hold the plungers depressed, whereby when latched the hand set may be removed from the base without rendering the telephone active and unlatching of the plate is required to permit the plungers to rise and render the telephone active.

3. A guard for a telephone instrument of the type described and having the construction defined in claim 1 in which the latching means comprises an aperture in the hinged plate and a resilient shouldered tongue struck up from the clip and cooperating with said aperture.

4. A guard for a telephone instrument of the type described and having the construction defined in claim 2 in which the latching means comprises an aperture in the hinged plate and a resilient shouldered tongue struck up from the clip and cooperating with said aperture.

FORREST F. MURRAY.

REFERENCES CITED

The following references are of record in the file of this patent:

UNITED STATES PATENTS

| Number | Name | Date |
|---|---|---|
| 942,366 | Deeter | Dec. 7, 1909 |
| 1,419,551 | Fleishman | June 13, 1922 |
| 1,520,739 | Zetlitz | Dec. 30, 1924 |
| 2,194,772 | Sengebusch | Mar. 26, 1940 |
| 2,215,874 | Gienger | Sept. 24, 1940 |
| 2,326,591 | White | Aug. 10, 1943 |
| 2,408,194 | Bourdius | Sept. 24, 1946 |
| 2,504,086 | Peters | Apr. 11, 1950 |